United States Patent
Chung

(10) Patent No.: US 10,677,882 B2
(45) Date of Patent: Jun. 9, 2020

(54) INTERCONNECTED SYSTEM AND DEVICE FOR OUTDOOR ACTIVITY GROUP

(71) Applicant: EVERBLISS GREEN CO., LTD., New Taipei (TW)

(72) Inventor: Wen-Chien Chung, New Taipei (TW)

(73) Assignee: EVERBLISS GREEN CO., LTD., New Taipei (TW)

( * ) Notice: Subject to any disclaimer, the term of this patent is extended or adjusted under 35 U.S.C. 154(b) by 0 days.

(21) Appl. No.: 16/355,943

(22) Filed: Mar. 18, 2019

(65) Prior Publication Data

US 2020/0088835 A1    Mar. 19, 2020

(30) Foreign Application Priority Data

Sep. 14, 2018 (TW) .............................. 107132499 A

(51) Int. Cl.
  *G01S 5/00* (2006.01)
  *H04W 4/029* (2018.01)
  *G01S 5/02* (2010.01)
  *H04W 4/02* (2018.01)

(52) U.S. Cl.
  CPC .......... *G01S 5/0294* (2013.01); *G01S 5/0284* (2013.01); *H04W 4/026* (2013.01); *H04W 4/029* (2018.02); *G01S 5/0231* (2013.01)

(58) Field of Classification Search
  CPC .... G01S 5/0294; G01S 5/0284; G01S 5/0231; H04W 4/029; H04W 4/026
  See application file for complete search history.

(56) References Cited

U.S. PATENT DOCUMENTS

| | | | | |
|---|---|---|---|---|
| 8,666,647 | B2* | 3/2014 | Kumabe | G05D 1/024 701/117 |
| 9,194,955 | B1* | 11/2015 | Fahrner | G01S 19/16 |
| 10,304,338 | B1* | 5/2019 | Lau | H04W 4/46 |
| 2007/0229290 | A1* | 10/2007 | Kahn | G16H 50/80 340/573.4 |
| 2010/0198453 | A1* | 8/2010 | Dorogusker | A63B 24/0062 701/31.4 |
| 2015/0031322 | A1* | 1/2015 | Twina | H04L 12/1895 455/404.1 |
| 2015/0179066 | A1* | 6/2015 | Rider | G08G 1/04 701/31.5 |
| 2015/0332563 | A1* | 11/2015 | Davis | G08B 5/006 342/66 |
| 2017/0109992 | A1* | 4/2017 | Lin | G08B 21/0438 |

* cited by examiner

*Primary Examiner* — Thomas D Alunkal

(57) ABSTRACT

Disclosed are an interconnected system and an interconnected device for an outdoor activity group that are capable of transmitting RF signals by a public open frequency band and transmitting a data packet in a relay manner without requiring the internet and external communication devices. The data packet includes the positioning information of a machine and each interconnected device, and each member of the outdoor activity group acts as a relay station to unlimitedly extend the communication distance of the whole group in a relay manner, so as to overcome the problem of losing contact caused by a long distance and a failed receipt of signals, and the interconnected system and device can improve the safety of outdoor activities.

9 Claims, 3 Drawing Sheets

INTERCONNECTED SYSTEM AND DEVICE FOR OUTDOOR ACTIVITY GROUP

FIELD OF THE INVENTION

The present invention relates to the field of an interconnected system and an interconnected device for an outdoor activity group, which transmit a radio-frequency signal by a public open frequency band and transmit a data packet by a relay transmission, so that each member of the outdoor activity group is acting as a relay station to extend the communication distance of the whole group in a relay manner, and more particularly to the connected system and device capable of improving the safety of outdoor activities in an environment without the Internet or external communication devices.

BACKGROUND OF THE INVENTION

In recent years, outdoor leisure activities, adventures, and tourism prevail, and networks and social networking sites are developed rapidly, so that outdoor activity lovers often organize outdoor activity groups such as mountaineering teams, adventure teams, cycling teams, motorcycle teams with a large number of members for long-distance outdoor activities.

As we all know, it is very essential to take safety into consideration for outdoor activities in addition to the arrangement of itinerary. However, in reality, accidents or events of missing team members are still seen. For example, a falling-behind member of a cycling team may have an accident, get lost, or lose contact, or a member of a mountaineering team or adventure team may be missing.

Among various accidents of the outdoor activity groups, the members of the mountaineering team or adventure team are most difficult to rescue or search. Since the itinerary of these activity groups is usually harsh, and these teams often go to an inaccessible environment that falls beyond the communication range of mobile phones, and the physical fitness of each member varies, so that the distance between the team members often exceeds the line of sight. If a member falls down in a valley unfortunately or loses direction, and other members have to wait for a long time at a gathering place which may be tens of kilometers away before the accident is discovered, and it is often too late to look back and search for the missing team member.

In addition, if the outdoor activity group searches in the opposite direction along the original path and still cannot find the missing team member, the only solution is to inform the rescue team through communications to go up to the mountain to search for the missing team member. However, the rescue team can only rely on the impression of other members, but cannot know exactly the location of the missing member. Therefore, it is often necessary to adopt a large-scale search in the mountain. If the weather is poor, then it will be very difficult to search and rescue the missing team member, and thus not just jeopardizing personal life and safety only, but also wasting lots of social resources.

To overcome the aforementioned problems, there are independent communications or warning systems of the existing technology designed for outdoor activity groups, such as those disclosed in R.O.C. Pat. Nos. 1446295, 1376652, 1553295, 1286420, M392493, etc. However, the biggest issue of these systems is that the obstacle caused by distance cannot be overcome in the absence of the Internet or telephones used for communicating with the outside world.

For example, if a mountaineering team is divided into a plurality of units, each consisting of a single member, two or more members, and the distance between any two units is 1-2 Km, and the number of mountaineering team members or the number of units exceeds 10, then the distance between the leading team member and the last falling-behind team member will exceed 10-20 Km. Obviously, the communications of the group is difficult. More importantly, in the event of losing contact, the search area will be hundreds of square kilometers. Searching in such vast and severe environment is just like searching needles in the haystack.

In the aforementioned prior arts, R.O.C. Pat. No. 1376652 uses the members' communication devices to connect with each other, so that the peripheral nodes of the group form a loop, and the inner peripheral nodes and outer peripheral nodes in the loop form a topological network. When any node in the topological network disappears, it indicates that the member holding the communication device may have an accident or may get lost.

Although the method above can control the status of each member more strictly, yet the required equipment cost, weight, and power of the communication devices in the topological network are not conducive to the mountain climbing activity of which members are lining up substantially in a straight line. Furthermore, a wireless communication module (such as WIFI or Bluetooth) required for an independent topological network has a maximum connection distance of only hundreds of meters, and thus it is inapplicable for the mountaineering team or cycling team having a relatively longer activity distance (up to tens of kilometers) between members.

In fact, a walkie talkie used for broadcasting RF signals by a public open frequency band has a transmission distance much greater than the transmission distance between the aforementioned communication devices. In addition the conventional walkie talkie does not need the Internet to transmit information, so that it has long been used as a contact device for an outdoor activity group. However, the conventional walkie talkie still has the shortcomings of insufficient distance and incapable positioning function.

SUMMARY OF THE INVENTION

Therefore, it is a primary objective of the present invention to overcome the aforementioned drawbacks of the prior art by providing an interconnected system and an interconnected device for an outdoor activity group that are capable of transmitting RF signals by a public open frequency band and transmitting a data packet in a relay manner for communications without the internet and external communication devices. The data packet includes the positioning information of a machine and each interconnected device, and each member of the outdoor activity group acts as a relay station to unlimitedly extend the communication distance of the whole group in a relay manner, so as to overcome the problem of losing contact caused by a long distance and a failed receipt of signals, and the interconnected system and device can improve the safety of outdoor activities. The invention is particularly applicable for group activities such as mountaineering, adventure, or cycling and capable of improving the safety of outdoor activities effectively.

To achieve the aforementioned and other objectives, the present invention provides an interconnected device for an outdoor activity group, and the interconnected device comprises a RF signal transmission module preset with a machine identification code, a positioning module capable of generating a machine positioning information, a signal processing unit, an indicating unit, and a power storage member for supplying electric power;

the RF signal transmission module is capable of receiving an external identification code and an external data packet transmitted by a RF signal transmission module of one or more external interconnected devices in a public open frequency band, and transmitting the external data packet to the signal processing unit for decoding after identifying the external identification code, so as to form one or more external positioning information provided for the indicating unit to display by sound, light or a screen; and the signal processing unit is capable of deleting any repetitive positioning information from the one or more external positioning information after decoding, and adding a machine positioning information for encoding, so as to form a machine data packet to be transmitted to the RF signal transmission module, and the RF signal transmission module transmits the machine data packet in a public open frequency band by a method of entraining the machine identification code.

In an embodiment, the interconnected device further comprises a central processing unit capable of receiving and transmitting an action instruction, and forming one or more external positioning information and the action instruction to the central processing unit after the external data packet is transmitted to the signal processing unit for decoding, and the indicating unit displaying the one or more external positioning information and action instructions by sound, light or a screen; and the signal processing unit deleting any repetitive positioning information from the one or more external positioning information after decoding, and adding the machine positioning information and action instruction after encoding to form a machine data packet to be transmitted to the RF signal transmission module, and the RF signal transmission module transmitting the machine data packet in a public open frequency band by a method of entraining the machine identification code.

The present invention further provides an interconnected system for an outdoor activity group, and the system comprises a plurality of interconnected devices and a management platform, the interconnected devices are provided for each member of the outdoor activity group to possess and use, and the management platform has a member management unit, a setting unit and a travel record unit; wherein the member management unit can be logged in by a machine identification code of each interconnected device individually, and each interconnected device of the interconnected system is turned on and capable of recognizing another interconnected device through the individual machine identification code; the setting unit is capable of specifying any one interconnected device as a leader of the outdoor activity group, so that the RF signal transmission module of the interconnected device can actively send out a data packet, and the data packet includes an action instruction that can be displayed by the indicating units of all interconnected devices; and the travel record unit is capable of recording the machine positioning information of each interconnected device.

Compared with the prior art, the present invention can transmit the machine identification code and machine positioning information from the interconnected devices held by the members of an outdoor activity group when they are unable to communicate to the outside as well as transmitting the positioning information to other interconnected devices in a relay manner to form a relay station, so that the outdoor activity group can unlimitedly extend its communication distance, and the invention can overcome the problems of the traditional way of using a satellite positioning device, a walkie talkie or mobile phone that results in a loss of contact due to a too-far distance or a failure of receiving signals. This invention is particularly applicable for group activities such as mountaineering, adventure or cycling and can improve the safety of outdoor activities effectively.

With the interconnected system of this invention, each interconnected device not just acts as a relay station to unlimitedly extend the communication distance in a relay manner only, but also manages the outdoor activity group in an environment with a network. Especially, in the events of missing members, natural disasters, car accidents or other irresistible disasters, the management platform can also provide references to police or related governmental agencies or civil rescue units, so that the safety of the whole outdoor activity group can be tracked and controlled.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
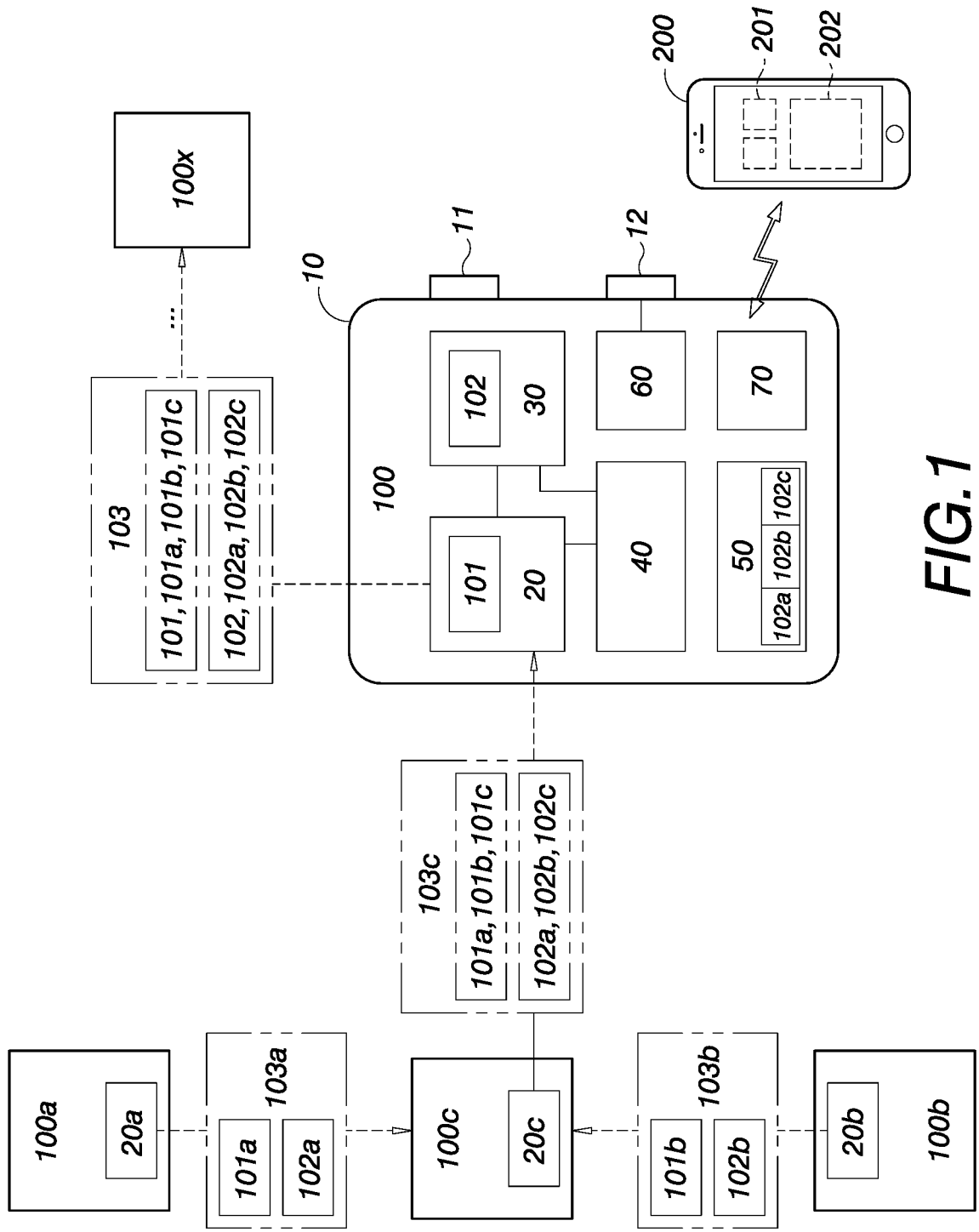
FIG. 1 is a schematic view of an interconnected device and an interconnected system in accordance with an embodiment of the present invention.

With reference to FIG. 1 for an interconnected device for an outdoor activity group in accordance with the present invention, the interconnected device 100 comprises a housing 10 further comprising an operating unit 11 and a plurality of charge/discharge ports 12, and the interconnected device 100 also comprises a RF signal transmission module 20 having a machine identification code 101, a positioning module 30 capable of generating a machine positioning information 102, a signal processing unit 40, an indicating unit 50 capable of displaying information by sound, light or a screen, and a power storage member 60.

Wherein, the power storage member 60 is electrically coupled to the charge/discharge port 12, and the charged power storage member 60 is provided for supplying the required power to all of the aforementioned components. If needed, the power storage member 60 may be charged by an external mobile device 200 such as a mobile phone through the charge/discharge port 12. The operating unit 11 can send a help message or an action instruction to the RF signal transmission module 20 to provide emergency call or instruct the itinerary of the team.

The RF signal transmission module 20 is capable of receiving external identification codes 101*a*, 101*b*, . . . transmitted from the RF signal transmission modules 20*a*, 20*b* of one or more external interconnected devices 100*a*, 100*b* and external data packets 103*a*, 103*b* . . . in the public open frequency band, transmitting the external data packets 103*a*, 103*b* . . . to the signal processing unit 40 for decoding after recognizing the external identification code 101*a*, so as to form one or more external positioning information 102a, 102b . . . to be transmitted to the indicating unit 50, and the indicating unit 50 displays the external positioning information 102a, 102b . . . .

When the RF signal transmission module 20 of the interconnected device 100 of one of the members of the outdoor activity group receives the external identification codes 101a, 101b . . . and the external data packets 103a, 103b transmitted from one or more external interconnected devices 100a, 100b, the external identification codes 101a, 101b . . . and the external data packets 103a, 103b are recognized and decoded into external positioning information 102a, 102b . . . , a specific position of the external interconnected device 100a, 100b . . . can be located and finally displayed by the indicating unit 50.

The interconnected device 100 receives the external identification code 101a, 101b . . . and the external data packet 103a, 103b . . . transmitted from the external interconnected device 100a, 100b . . . , while the signal processing unit 40 is encoding the decoded external positioning information 102a, 102b . . . and the machine positioning information 102 generated by the positioning module 30, so as to form a machine data packet 103 to be transmitted to the RF signal transmission module 20, and the RF signal transmission module 20 similarly transmits the machine data packet 103 in the public open frequency band by a method of entraining the machine identification code 101.

In other words, when the RF signal transmission module 20 transmits the machine data packet 103, the machine identification code 101 is included and provided for the recognition by another external interconnected device 100x. Since the machine data packet 103 includes the machine positioning information 102 and the external positioning information 102a, 102b . . . , therefore when other external interconnected device 100x receives the machine data packet 103, the external interconnected device 100x can obtain the specific positions of other two or more members at the same time according to the machine positioning information 102 and the external positioning information 102a, 102b . . . .

If the aforementioned method is applied to the whole outdoor activity group, and each member of the outdoor activity group holds an interconnected device 100, 100a, 100b . . . 100x, each interconnected device can transmit the machine identification code and the machine positioning information and also can transmit the positioning information to other interconnected device in a relay manner, so that the outdoor activity group can unlimitedly extend the communication distance and specifically control the position of each member.

For example, if the outdoor activity group has 20 members, and the distance between any two interconnected devices held by two members is 1 km, the team will have a length up to 19 km. If there is no network or mobile phone signal, the distance between the leading member at the front and the falling-behind member at the back will exceed a general RF signal communication range very much. The aforementioned relay transmission method of the present invention can overcome the problem of loss of contact caused by a too-far distance and a failure of receiving signals. The invention is particularly applicable for group activities such as mountaineering, adventure, or cycling and capable of improving the safety of outdoor activities effectively.

The aforementioned method of transmitting the positioning information of each interconnected device and other interconnected device in a relay manner has the following advantages. Assumed that a member situated at the middle is missing, the interconnected devices of the members at the front and the rear can immediately know that the signal of the interconnected device of the missing member cannot be received, and the members of the whole outdoor activity group can know that there is a situation and send the nearest member (the one in the front or the on at the back) to look for the missing member, so as to improve the emergency rescue efficiency.

In an embodiment as shown in FIG. 1, the positioning module 30 and the signal processing unit 40 are electrically coupled to each other, and both may be a global positioning system (GPS) chip or a computing unit, and the computing unit can calculate the distance to generate the machine positioning information 102 according to the intensity and/or speed of the signal received by the RF signal transmission module 20. In an embodiment, the interconnected device 100 further comprises a wireless transmission module 70 such as a Bluetooth or WIFI device capable of connecting an external mobile device 200 by signals, and the external mobile device 200 has an application program 201 with an operation and display interface, and the application program 201 of the external mobile device 200 includes a map 202 that shows a specific location according to the machine positioning information 102, and the external positioning information 102a, 102b . . . .

Figure 2:
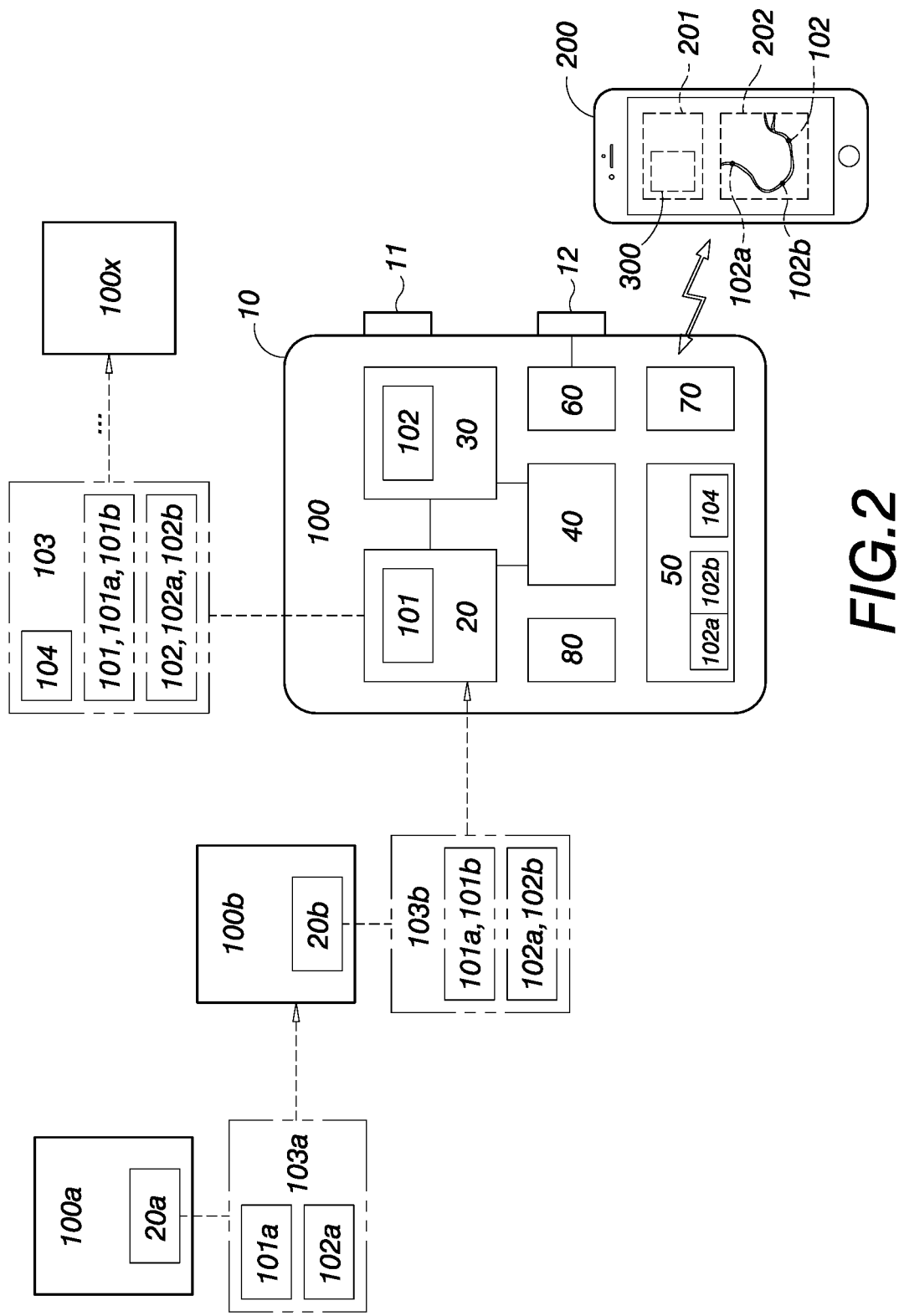
FIG. 2 is a schematic view of an interconnected device in accordance with an embodiment of the present invention.

With reference to FIG. 2 for an interconnected device 100 in accordance with an embodiment of the present invention, the interconnected device 100 has a basic function of transmitting the aforementioned positioning information and also can transmit an action instruction 104 as an action indicator of the whole outdoor activity group. For example, the action instruction 104 may be "Gather at the forked road ahead", "Help looking for 100b", "Turn left at the forked road ahead", etc. Refer to the figure for the specific implementation method. In addition to the aforementioned housing 10, operating unit 11, charge/discharge port 12, RF signal transmission module 20, positioning module 30, signal processing unit 40, indicating unit 50, and power storage member 60, the elements of this embodiment are substantially the same as those of the first embodiment, except that a central processing unit 80 capable of generating or transmitting an action instruction 104 is added in this embodiment.

The action instruction 104 can be generated by the operating unit 11 of any interconnected device 100, and then the central processing unit 80 drives the indicating unit 50 to display the action instruction n104, and adds the action instruction 104 to the data packet 103 containing one or more external positioning information 102a, 102b . . . and then transmits the data packet 103 to another external interconnected device 100x. Each interconnected device can generate the action instruction 104 actively, and the interconnected device may execute the action instruction 104 upon its receipt only. For example, only the interconnected devices of the leader or captain of the team are set to have the function of announcing the action instruction 104, and other interconnected devices can only execute and transmit the action instruction 104 only, in order to ensure the instruction clearly.

Figure 3:
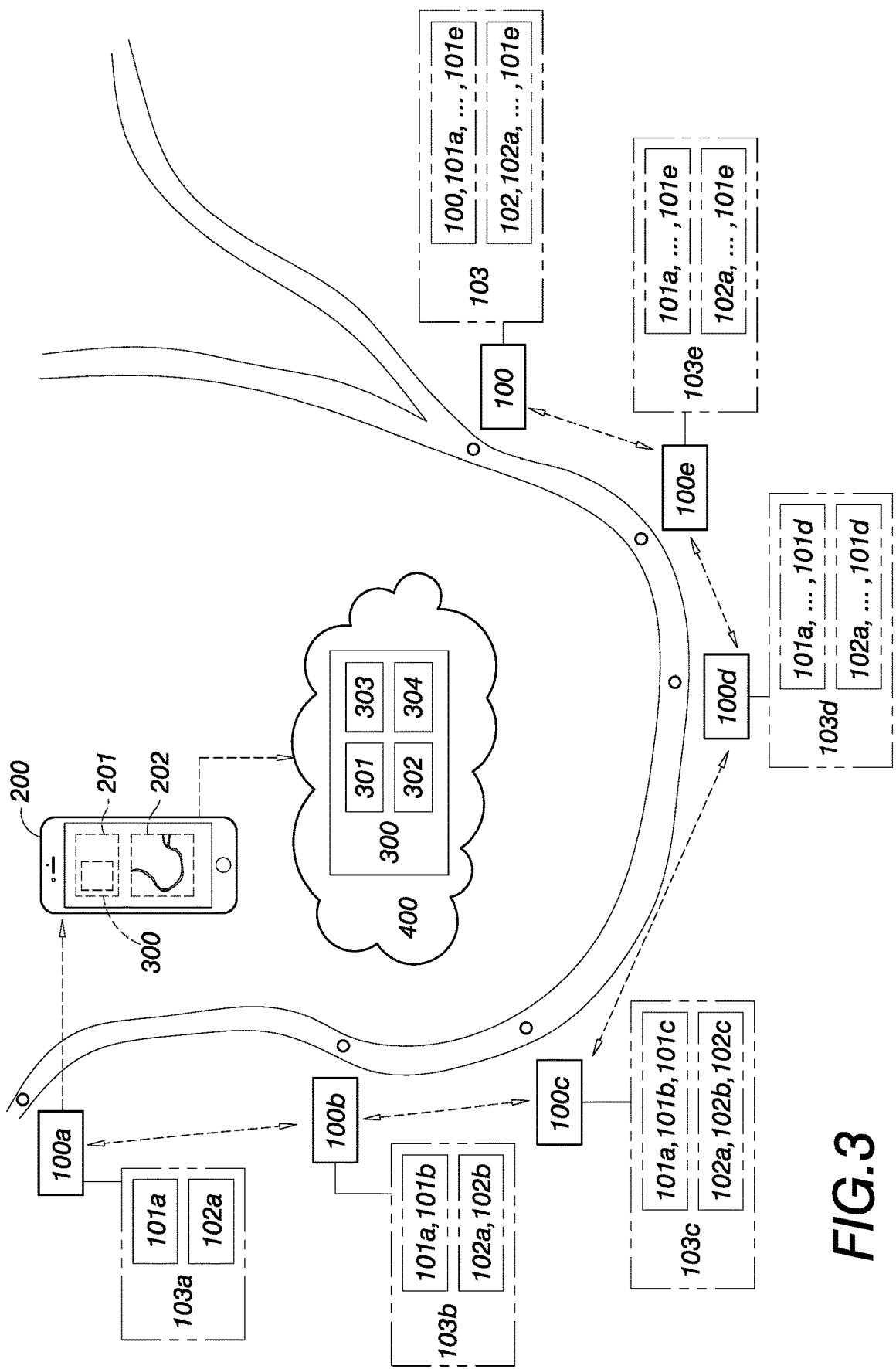
FIG. 3 is a schematic view of an interconnected system in accordance with an embodiment of the present invention.

In FIGS. 1 to 3, the interconnected devices 100 of the present invention may form an interconnected system to improve the management. In addition to the plurality of interconnected devices 100, 100a, 100b . . . as described above, the interconnected system further comprises a management platform 300 having a member management unit 301, a setting unit 302, and a travel record unit 303.

The member management unit 301 is capable of logging in each interconnected device 100, 100a, 100 by individual machine identification codes 101, 101a, 101b turning on each interconnected device 100, 100a, 100b of the interconnected system, and recognizing each other through the individual identification codes 101, 101a, 101b . . . .

The setting unit 302 of the management platform 300 can specify any one interconnected device 100, 100a, 100b . . . as a leader of the outdoor activity group, and the RF signal transmission module of the interconnected device can actively send out a data packet, and the data packet includes an action instruction that can be displayed by the indicating units of all interconnected devices. The travel record unit 303 can record the positioning information 102, 102a, 102b . . . of each interconnected device 100, 100a, 100b . . . .

In an embodiment, the management platform 300 can be built in the application program 201 and/or built in a cloud server 400, so that the external mobile device 200 can connect to the cloud server 400 through the Internet. In addition, the management platform 300 also has a map 304, and the map 304 can show the specific positions of the interconnected devices 100, 100a, 100b . . . of each logged-in member management unit 301 respectively according to each positioning information 102, 102a, 102b . . . .

With the interconnected system of this invention, each interconnected device 100, 100a, 100b . . . not just acts as a relay station to unlimitedly extend the communication distance in a relay manner only, but also manages the outdoor activity group in an environment with a network. Especially, in the events of missing members, natural disasters, car accidents or other irresistible disasters, the management platform 300 can also provide references to police or related governmental agencies or civil rescue units, so that the safety of the whole outdoor activity group can be tracked and controlled.

While the present invention has been described by means of specific embodiments, numerous modifications and variations could be made thereto by those skilled in the art without departing from the scope and spirit of the present invention set forth in the claims.

What is claimed is:

1. An interconnection device for an outdoor activity group, the interconnection device usable in an interconnected system, the interconnected system including a plurality of external interconnection devices configured for bidirectional transmission with each other, the plurality of external interconnection devices respectively usable by members of the outdoor activity group, the interconnection device comprising:
   a radio-frequency (RF) signal transmission module preset with a machine identification code,
   a positioning module configured to generate machine positioning information,
   a signal processing unit,
   an indicating unit, and a
   power storage member for supplying electric power;
   wherein the RF signal transmission module is configured to receive an external identification code and an external data packet transmitted by a RF signal transmission module of one or more external interconnection devices in a public open frequency band, and transmitting the external data packet to the signal processing unit for decoding after identifying the external identification code, so as to provide one or more sets of external positioning information obtained from the external data packet for the indicating unit to display by sound, light, or a screen;
   wherein the positioning module is electrically coupled to the signal processing unit, and the signal processing unit is capable of deleting any repetitive positioning information from the one or more sets of external positioning information after decoding, and configured to add the machine positioning information for encoding, so as to form a machine data packet to be transmitted to the RF signal transmission module, and the RF signal transmission module transmits the machine data packet in a public open frequency band, the transmitted machine data packet including the machine identification code for reception by external interconnected devices in the interconnected system;
   wherein the machine data packet comprises the machine positioning information and the one or more sets of external positioning information, so that external interconnection devices in the interconnected system can receive, transmit, and relay information to each interconnection device in the interconnected system.

2. The interconnection device according to claim 1, further comprising:
   a central processing unit configure to receive and transmit an action instruction, and forming one or more sets of external positioning information and the action instruction after the external data packet is transmitted to the signal processing unit for decoding, and
   the indicating unit is configured to display the one or more sets of external positioning information and the action instruction by sound, light or a screen; and
   wherein the signal processing unit deletes any repetitive positioning information from the one or more sets of external positioning information after decoding, and adds the machine positioning information and action instruction after encoding to form a machine data packet to be transmitted to the RF signal transmission module, and the RF signal transmission module transmitting transmits the machine data packet in a public open frequency band, the machine data packet including the machine identification code for reception by other interconnection devices in the interconnected system;
   wherein the machine data packet comprises the machine positioning information, the one or more sets of external positioning information, and the action instruction.

3. The interconnection device for an outdoor activity group according to claim 2, wherein the positioning module is a satellite positioning chip or a computing unit, and the computing unit is capable of calculating a distance to generate the machine positioning information according to the intensity or speed of the signal received by the RF signal transmission module.

4. The interconnection device for an outdoor activity group according to claim 2, wherein the interconnection device comprises a housing, an operating unit installed on the housing, and a charging port disposed on the housing and electrically coupled to the power storage member, and the operating unit is configured to cause the central processing unit to send out a help message and a data packet having the action instruction.

5. The interconnection device for an outdoor activity group according to claim 2, wherein the interconnection device further comprises a wireless transmission module connectible to an external mobile device, and the external mobile device has an application program with an operation and display interface.

6. The interconnection device for an outdoor activity group according to claim 5, wherein the application program of the external mobile device includes a map configured to show a specific location according to the one or more sets of external positioning information and the machine positioning information.

7. An interconnected system for an outdoor activity group, comprising a plurality of interconnection devices as claimed in claim 6, and a management platform, and the interconnection devices are provided for each member of the outdoor activity group to possess and use, and the management platform has a member management unit, a setting unit and a travel record unit; wherein the member management unit can be logged into by a machine identification code of each interconnection device individually, and each interconnection device of the interconnected system is turned on and capable of recognizing another interconnection device through the respective machine identification code; the setting unit is capable of specifying any one interconnection device as a leader of the outdoor activity group, so that the RF signal transmission module of the interconnection device can actively send out a data packet, and the data packet includes an action instruction that can be displayed by the indicating units of all interconnection devices; and the travel record unit is capable of recording the machine positioning information of each interconnection device.

8. The interconnected system for an outdoor activity group according to claim 7, wherein the management platform is built in the application program or built in a cloud server, so that the external mobile device can be connected via a network.

9. The interconnected system for an outdoor activity group according to claim 8, wherein the management platform has a map, and the map is capable of showing a specific position of the interconnection device according to the positioning information in each logged-in member management unit.

\* \* \* \* \*